United States Patent [19]

Ishikawa et al.

[11] 4,088,001
[45] May 9, 1978

[54] METHOD OF MANUFACTURING A STRUT MEMBER MADE OF A TUBE MATERIAL FOR USE WITH DRUM BRAKES

[75] Inventors: Masakazu Ishikawa; Juichi Shibatani; Hiroyuki Oka; Naomi Mitsuoka; Mitsuo Matsuda, all of Toyota, Japan

[73] Assignees: Hosei Buleki Kogyo Kabushiki Kaisha; Toyota Jidosha Kogyo Kabushiki Kaisha, both of Toyota, Japan

[21] Appl. No.: 773,661

[22] Filed: Mar. 2, 1977

[30] Foreign Application Priority Data

Sep. 13, 1976 Japan .................. 51/109611

[51] Int. Cl.² ............................. B21D 53/88
[52] U.S. Cl. ...................... 72/370; 72/401; 113/116 Q
[58] Field of Search ............ 72/370, 398, 401, 471; 29/150, 157 C; 113/116 Q

[56] References Cited

U.S. PATENT DOCUMENTS

| | | | |
|---|---|---|---|
| 1,982,362 | 11/1934 | Trembley | 72/370 |
| 2,267,623 | 12/1941 | Self et al. | 29/157 C |
| 2,367,783 | 1/1945 | Kerwin et al. | 72/370 |

*Primary Examiner*—Lowell A. Larson
*Attorney, Agent, or Firm*—Browdy and Neimark

[57] ABSTRACT

An improved method of manufacturing a strut member for use in a strut device of the drum brake, having two strut members and a connecting member provided with a threaded portion for linking both, to function as an adjustor of the shoe clearance. This manufacturing method comprises as least the following two processes: (a) forming a flat plate-like portion partially on a length of a tube while producing a through bore therein as a displaced space, by inserting a mandrel substantially concentrically into a tube material, pressing or squeezing a portion of the tube in the diametrical direction in such a manner that the inside of the tube is pressed onto the mandrel for producing the displaced space therein, after retracting the mandrel until the inside surface of the tube at upper and lower portion thereof on either side of the displaced space closely contact to each other; and (b) forming a cut-out, ranging from the extremity of the tube to a part of the flattened portion, such that the through bore can have the opening thereof at the bottom of the cut-out to be able to engage with the web portion of a brake shoe.

4 Claims, 19 Drawing Figures

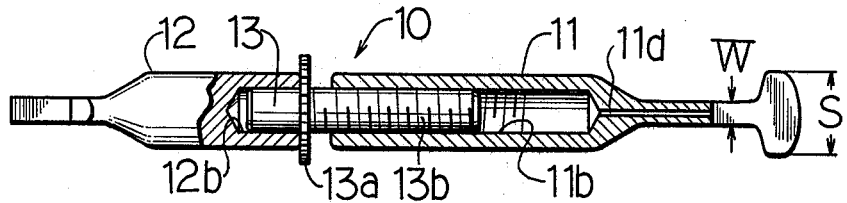
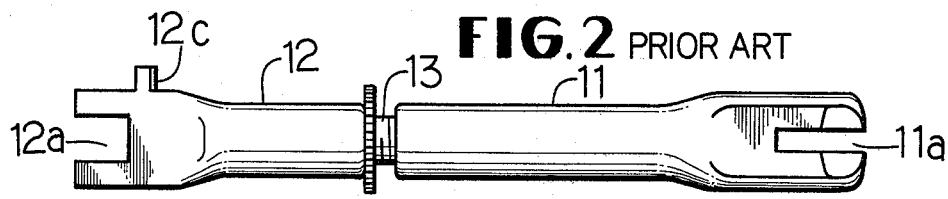
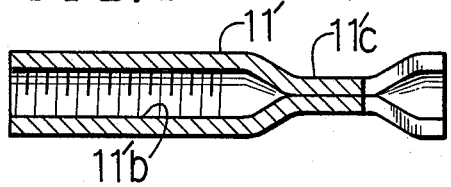
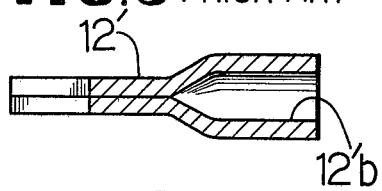
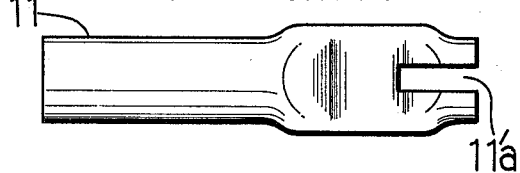
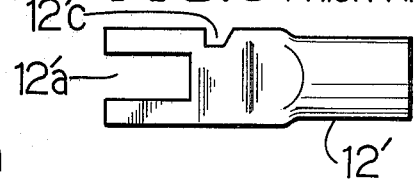
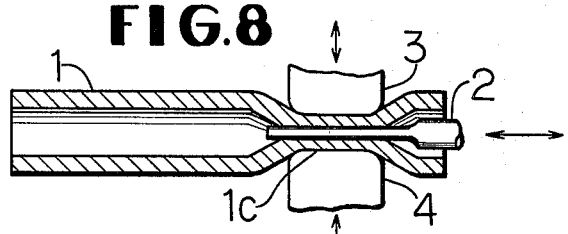
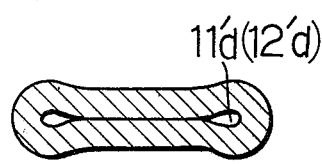
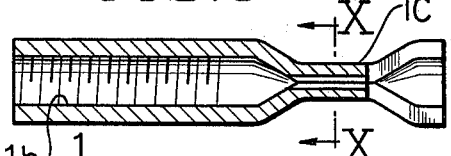
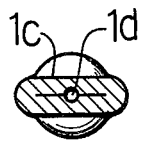
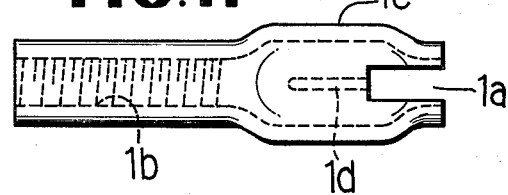

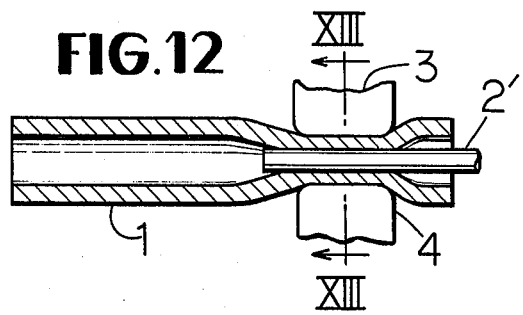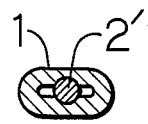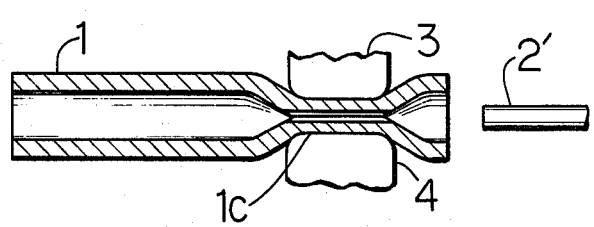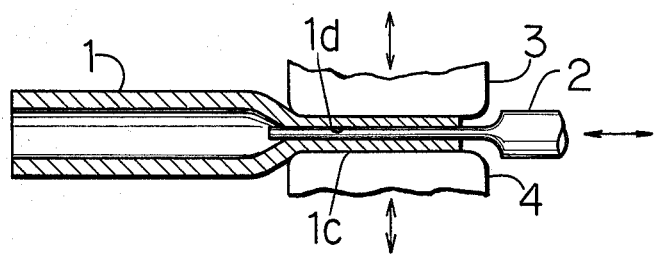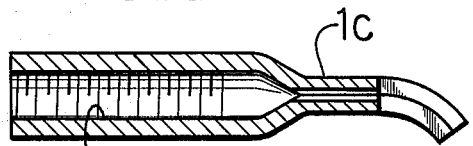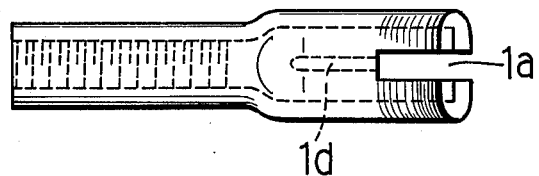

METHOD OF MANUFACTURING A STRUT MEMBER MADE OF A TUBE MATERIAL FOR USE WITH DRUM BRAKES

BACKGROUND OF THE INVENTION

The present invention relates to a strut device for use in a drum brake, more particularly, to a method of manufacturing an improved strut member, which is a component of the strut device, from a tube material. A strut device of the type shown in FIGS. 1 and 2 which are referred in the brief description of the drawing, is widely employed for the purpose of compensating the increase of the brake gap, an operating gap of the brake shoe, due to wearing of the brake lining in a drum brake. The strut device 10 is composed of a first and a second strut members 11 and 12 and a connecting member 13 linking both, which is a rod of circular cross-section having a star-wheel in the middle thereof, and is provided with an internally threaded portion or tapped hole 13b on one end.

The first strut member 11 is provided with a rectangular cut-out 11a on one ned thereof for engaging with the web of a brake shoe and a threaded hole 11b on the other end for threadedly engaging with the threaded portion 13b of the connecting member 13, while the second strut member 12 is provided with a rectangular cut-out 12a on one end thereof for engaging with the web of another brake shoe and a bore 12b on the other end for rotatably receiving the opposite end portion from the threaded portion 13b of the connecting member 13.

When the star-wheel 13a is in the strut device 10 of such a construction, rotated manually or by means of an adjustor lever such as a hand brake lever (not shown), the strut device 10 is elongated by the moving action taking place between the internally threaded portion 11b and the externally threaded portion 13b, and the shoe clearance is thereby adjusted.

The first and second strut members 11, 12 are relatively, in general, complicated in configuration due to their mechanical function(s). The first strut member 11 is, for example, engaged with the web portion of the brake shoe by the cut-out 11a thereof; and the former and the latter rotate relatively to each other, when the brake is operated, in a parallel direction to the plane of the drawing paper in FIG. 1, only a slight angle, though. When the dimension W in FIG. 1 is large, the brake shoe web and the first strut member can not rotate smoothly. The dimension W is, therefore, required to be small to the greatest possible extent. The width S of the end portion of the strut device 10 for engaging with the web portion of the brake shoe is desired, on the contrary, to be as large as possible from the view point of the length adjusting function of the strut device 10; because the wider width S will easier prevent the first strut member 11 from rotating with the connecting member. As a result of this the first strut member 11 is obliged to be of such an intricate configuration, as shown in FIG. 1, that is becomes once narrow in width (W) and then expands (S) again.

The second strut member 12 is also inevitable to be of complicated configuration, as shown in FIG. 2, being provided with a projection 12c for engaging with the adjust lever (not shown) to oscillate the same.

In the conventional manufacturing method both the first strut member 11 and the second strut member 12 have been, therefore, made of a forged material of high cost and then worked by a time-consuming machining process.

One of the co-inventors of the present invention developed before a manufacturing method of the first strut member 11, as shown in FIGS. 3 and 4, from a tube material; and another inventor offered similarly a manufacturing method of the second strut member 12 as shown in FIGS. 5 and 6. It has been attained to drastically decrease the production cost of the strut members by these inventions.

The principal object of the present invention is to provide a further improved method of manufacturing of the strut members.

Prior to the description of the preferred embodiments of this invention, more detailed explanation of the abovementioned manufacturing method of the strut members will be stated for better understanding of this invention.

The first strut member 11' shown in FIGS. 3 and 4 is formed by (1) pressing flat a part of a tube material in the diametrical direction, at a portion a predetermined distance apart from one extremity toward the central portion, to shape a flat plate-like portion 11'c (hereinafter simply referred to as a flat portion); (2) making a cut-out 11'a parallelly to the tube axis and perpendicularly to the flat portion 11'c, ranging from the right extremity of the tube to a part of the flat portion 11'c; and (3) making a threaded bore 11'b on the inner surface of the tube at the other end. This article was once thought a great success having satisfied the aforementioned requirements.

The second strut member 12' is formed, as shown in FIGS. 5 and 6, by (1) pressing flat one end portion of a tube material in the diametrical direction into a flat portion; and (2) forming a cut-out 12'a in the flat portion parallelly to the tube axis and another cut-out 12'c perpendicularly to the tube axis. By modifying the conventional method of forming a projection 12c on the second strut member 12, for engaging with the adjust lever by being received in an aperture thereof, into a new method of forming a cut-out in the second strut member 12' for receiving a projection disposed on the adjust lever in order to engage therewith, the manufacturing of the second strut member from a tube material was successful.

SUMMARY OF THE INVENTION

The present invention relates to a further improvement of the abovementioned manufacturing method of the strut members for the strut device to be used in a drum brake.

It is an object of this invention to provide an improved manufacturing method of the strut members wherein a mandrel of variously modified type is used such as, in addition to of circular cross-section, of elliptical cross-section, of parallelogrammic cross-section, of triangular cross-section, of square cross-section, and so forth.

It is still another object of this invention to provide an improved manufacturing method of the strut members wherein a part of the tube, at a portion a certain space distant toward the center from the extremity, is pressed flat into a flat portion, with a mandrel being inserted similarly to the abovementioned.

It is still further object of this invention to provide an improved manufacturing method of the strut members wherein a two-step pressing process is adopted, that is, after a pressing of the tube has been executed once, with a set of punch and die, onto a large-sectional mandrel inserted in the tube, the punch and die are drawn back apart and the mandrel is retracted before the second-round pressing begins with the re-forwarded punch and die, until the inside of the tube is closely contacted to each other leaving the displaced space therein.

It is still another object of this invention to provide an improved manufacturing method of the strut members wherein one end portion of the tube is pressed for a certain length thereof to form the flat portion similarly to the abovementioned.

It is further object of this invention to provide an improved manufacturing method of the strut members wherein the end portion of the flat portion is curved or bent within a certain angle against the flat portion.

BRIEF DESCRIPTION OF THE DRAWING

FIG. 1 and FIG. 2 are views showing an example of the conventional strut device, the former being a plan view partly cut away and the latter an elevation;

FIG. 3 and FIG. 4 are views of the first strut member developed before by one of the co-inventors of this invention, the former being a sectional plan view and the latter an elevation;

FIG. 5 and FIG. 6 are views of the second strut member developed before by another inventor of this invention, the former being a sectional plan view and the latter an elevation;

FIG. 7 is an cross-sectional view for explaining a process of forming a through bore or bores in the flat portion of the strut member;

FIG. 8 is a sectional view for explaining an embodiment in accordance with this invention;

FIGS. 9 to 11 are views showing an example of the first strut member manufactured by the method illustrated in FIG. 8, wherein FIG. 9 is a sectional plan view, FIG. 10 is a cross-section taken along the line X — X of FIG. 9, and FIG. 11 is an elevation;

FIG. 12 is a sectional plan view illustrating a second embodiment;

FIG. 13 is a cross-sectional view taken along the line XIII — XIII of FIG. 12;

FIG. 14 is a view similar to FIG. 12 at a later stage;

FIGS. 15 and 16 are views similar to FIG. 13 for showing different embodiments, respectively;

FIG. 17 is a sectional plan view showing still another embodiment; and

FIGS. 18 and 19 are views showing an example of the first strut member manufactured by the method illustrated in FIG. 17, the former being a sectional plan view and the latter an elevation.

DETAILED DESCRIPTION OF THE INVENTION

Before entering the description of the actual embodiments some comments on the problems concerning the invention will be illustrated. When applying plating or surface coating process to the inside of the strut members, which is desireable for improving the quality of the article, perfectly blind threaded bore 11'b or unthreaded round bore 12'b is disadvantageous to be fully processed. When assembling the strut device greasing is required between the members, and the air that may happen to be sealed in the blind bore, for example, between the connecting member 13 and the threaded bore 11'b of the first strut member 11' or the connecting member 13 and the round bore 12'b of the second strut member 12', will be compressed to prevent the grease from filling in the bore and the elements from perfectly engaging with each other. Therefore, the threaded bore 11'b and the round bore 12'b are desired not to be perfectly blind, but to have an opening. In order not to make the threaded bore 11'b and the round bore 12'b perfectly blind, a way of leaving uncontacted places or openings on both edges inside the tube, instead of pressing it into perfect close contact, when forming the flat portion by the pressing process, as shown in FIG. 7, is of course possible. And the left uncontacted places, or through bores 11'd (or 12'd), can be utilized for venting path of air or flow-path for the plating liquid or coating material. In that case these through bores do not meet the requirement that they should be protected by the brake shoe from dust ingress while in use. In the old type strut members the through bore 11d, as can be seen in FIG. 1, was drilled so as to be open at the bottom of the cut-out 11a, and it was covered and protected, while in use, by the engaged brake shoe from dust ingress. Eliminating the disadvantage, that is, such an exposed state, as shown in FIG. 7, of the through bore 11'd to dust ingress, and simultaneously eliminating the uneconomical drilling process is the gist of this invention.

The manufacturing method of the strut members in accordance with this invention which uses a tube as material can be characterized into the following two processes:

(a) pressing or squeezing a part of a tube material in the diametrical direction to make upper and lower portions of the inside surface thereof contact with each other, with a mandrel being substantially concentrically inserted thereinto at the same time, such that the inside surface of the tube is so strongly pressed onto the mandrel as a displaced space or indentation thereof can be longitudinally formed therearound in the axial direction, and in some cases further pressing the tube after the retraction of the mandrel, until the reminder of the tube inside other than the mandrel bored portion can be closely contacted to each other, thereby to form a flat portion on a certain length of the tube having a through bore or opening therein as the displaced space in order to communicate the tube inside with the atmosphere ambient; and (b) making a cut-out, ranging from the extremity of the tube to a part of the flat portion, such that the through bore can have the opening thereof at the bottom of the cut-out.

Referring to the drawing a few preferred embodiments will be described. In FIG. 8, a first embodiment, an example of forming a flat portion 1c on a tube 1 is illustrated wherein a mandrel 2 is concentrically inserted thereinto and then a part of the tube is pressed flat at a portion a preset space distant from the extremity toward the center by a punch 3 and a die 4 from either vertical direction to form a flat portion 1c. This process makes the inside of the tube at the flat portion 1c contact closely to each other and leaves at the same time a displaced space where the mandrel was pressed on; drawing back of the punch 3 and die 4 and retraction of the mandrel 2 will provide a semi-finished article, having a flat portion 1c which includes a through bore 1d as can be seen in FIG. 10, axially formed therein as the displaced space by the mandrel 2. By executing the machining process on the semi-finished article to make a cut-out 1a and a threaded bore 1b, the first strut member illustrated in FIGS. 9 to 11 will be obtained. This embodiment shows a manufacturing method of a strut member at a stroke, however, by taking advantage of the pressing process with double purposes, forming a flat portion and a through bore at the same time; which strut member enjoys an effect of protecting the bore from dust ingress because of the covering by the brake shoe, while eliminating the drilling process for forming the through bore.

A second embodiment is shown in FIGS. 12 to 14, wherein a two-step pressing process is adopted instead of the single-step pressing process of the previous embodiment in which the flat portion 1c and the through bore 1d are simultaneously pressed. As shown in FIG. 12 a relatively thick (large cross-sectioned) mandrel 2 is inserted into a tube 1 substantially concentrically for being pressed once by a punch 3 and die 4 at a place preset space distant toward the center from the extremity of the tube 1; after having formed a displaced space (or indentation) as shown in FIG. 13 inside the tube, the punch 3 and die 4 are retracted and the mandrel 2 is also drawn back before the second round pressing by the punch and die begins to form the flat portion 1c by strongly pressing until the upper and lower portions of the inside of the tube contact closely to each other, but leaving a through bore therein. The ensuring machining process is just the same as the previous case, requiring no further explanation.

In this embodiment the retraction of the mandrel 2 is extremely easy because of a large spring-back amount of the tube 1 after the first round pressing; durability of the mandrel is also extremely enhanced because of a relatively large diameter thereof. Additional comments must be disclosed here concerning the previous two embodiments. A mandrel of circular cross-section is employed in the aforegoing two embodiments, which is not necessarily limited to that. Various types of mandrel may be used, for example, of triangular, square, parallelogrammic, elliptical cross-section, and so on. Particularly in the case of the two-step pressing process of a tube 1, shown as a third embodiment in FIGS. 15 and 16, a mandrel of elliptical cross-section placed in its line of apsides direction or that of square cross-section placed in its diagonal direction may produce a relatively sharp displaced space irrespective of rather thick cross-section of the mandrels 2″ or 2‴.

In the previous embodiments machining work for forming the cut-out 1a and the threaded bore 1b is executed after the pressing process of the flat portion 1c and the through bore 1d have been finished, which can advantageously prevent errors from occurring in the cut-out 1a and the tapped portion 1b due to the deformation which may take place in the tube 1 while pressing the same. Of course this order of the process is not necessarily limited to that; a reversion of the process order is permissible.

A fourth embodiment will be disclosed referring to FIGS. 17 to 19, which is similarly concerned with the manufacturing of the first strut member but of slightly modified configuration.

After inserting a mandrel 2 substantially concentrically into a tube 1, a part of the tube is pressed flat by a punch 3 and die 4 to form the flat portion 1c and the through bore 1d simultaneously, thereafter the end portion of the flat portion 1c is bent or curved within a certain angle from the direction of the center line, followed by machining or punching process for the threaded bore 1b inside the other end portion of the tube. FIGS. 18 and 19 show the first strut member manufactured by this method.

The above detailed description is concerned with the manufacturing of the first strut member, which is not necessarily limited thereto but applicable to the manufacturing of the second strut member, further being good for all kinds of strut members, even when the configuration is more or less modified, manufactured from a tube material by means of pressing a part of it in the diametrical direction.

This invention can be summarized in that, as stated above in greater detail, it has developed a novel method of manufacturing strut members, in an easy and economical way, fully comparable to the conventional articles of high production cost. It has also succeeded in eliminating the drilling process that has been thought inevitable, by taking advantage of a simple method of using a tube as material and employing a mandrel for forming a through bore to be used as a venting path and as a flowing path for the plating material.

It will be obvious to those skilled in the art that various changes may be made without departing from the scope of the invention and the invention is not to be considered limited to what is shown in the drawings and described in the specification.

We claim:

1. A method of manufacturing a strut member usable in a strut device of a drum brake, made of a tubular stock material and having a threadedly connectable portion in the middle thereof for adjusting shoe clearance, the method comprising:

(a) forming on the tubular stock a flat plate-like portion having a through bore therein as a displaced space, by inserting a mandrel substantially concentrically into said tubular stock material, pressing or squeezing a given length of said tubular stock material in the diametrical direction onto the mandrel for contemporaneously bringing portions of the inner surface thereon into contact, forming said flat plate-like portion and producing a through bore therein as a displaced space, said portions of said inner surface defining respective upper and lower portions of said tubular stock material, and withdrawing said mandrel thereby leaving said portions of said inner surface in contact with said displaced space as a through bore in the member for allowing communication with the atmosphere ambient; and (b) making a cut-out substantially of a rectangular shape, in a plan view, ranging from an extremity of said tubular stock material to a part of said flat portion, such that said through bore has one opening thereof at one end of said cut-out to be able to be engaged with a web portion of a brake shoe.

2. A method of manufacturing a strut member as set forth in claim 1, wherein a mandrel of circular cross section is employed.

3. A method of manufacturing a strut member as set forth in claim 1, wherein a mandrel of elliptical cross section, placed in a position in which the line of apsides is parallel to the pressing direction, is employed.

4. A method of manufacturing a strut member as set forth in claim 1, wherein the flat portion is made at an end portion of said tubular stock material and bending said end portion within a given angle agains an unbent part of said tubular stock material.

* * * * *